US011772419B2

(12) United States Patent
Kamath et al.

(10) Patent No.: US 11,772,419 B2
(45) Date of Patent: Oct. 3, 2023

(54) UNITIZED WHEEL END ASSEMBLY

(71) Applicant: AKTIEBOLAGET SKF, Gothenburg (SE)

(72) Inventors: Ganesh Kamath, Ann Arbor, MI (US); Cengiz R Shevket, Chelsea, MI (US); Fabricio Teixeira, New Hudson, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 741 days.

(21) Appl. No.: 16/800,045

(22) Filed: Feb. 25, 2020

(65) Prior Publication Data

US 2021/0260919 A1 Aug. 26, 2021

(51) Int. Cl.
*B60B 27/02* (2006.01)
*B60B 27/00* (2006.01)

(52) U.S. Cl.
CPC ............ *B60B 27/02* (2013.01); *B60B 27/001* (2013.01); *B60B 27/0073* (2013.01); *B60B 27/0078* (2013.01); *B60B 2380/14* (2013.01)

(58) Field of Classification Search
CPC ... B60B 27/001; B60B 27/02; B60B 27/0073; B60B 27/0078; B60B 35/12; F16B 41/002; F16B 43/00
See application file for complete search history.

(56) References Cited

U.S. PATENT DOCUMENTS

| 3,336,998 | A | * | 8/1967 | Avrea | B60B 35/12 |
| | | | | | 180/339 |
| 4,432,557 | A | * | 2/1984 | Drucktenhengst | F16J 15/3256 |
| | | | | | 277/560 |
| 7,658,386 | B2 | * | 2/2010 | Oldenburg | F16J 15/3256 |
| | | | | | 277/572 |
| 8,967,932 | B2 | * | 3/2015 | Dionne | F16B 39/24 |
| | | | | | 411/533 |
| 10,093,128 | B2 | * | 10/2018 | Lv | F16C 17/10 |
| 10,208,801 | B1 | * | 2/2019 | Wang | F16C 33/7886 |
| 10,415,626 | B2 | * | 9/2019 | Kaas | F16B 39/26 |

(Continued)

FOREIGN PATENT DOCUMENTS

| CN | 105952802 | A | * | 9/2016 | ........... B60B 27/001 |
| CN | 106114056 | A | * | 11/2016 | ........... B60B 27/001 |

(Continued)

*Primary Examiner* — Jason R Bellinger
(74) *Attorney, Agent, or Firm* — J-TEK LAW PLLC; Scott T. Wakeman; Mark A. Ussai

(57) ABSTRACT

A wheel end assembly includes a hub connectable with a wheel and having a bore for receiving a shaft. An inboard bearing within the bore includes an outer ring coupled with hub, an inner ring within the outer ring and rolling elements. A seal assembly is coupled with the inner ring and retains the inner ring within the outer ring when the end assembly is separate from the shaft. An outboard bearing within the hub bore includes an outer ring coupled with the hub, an inner ring within the outer ring and rolling elements. A nut assembly is disposed adjacent to the outboard bearing and includes a nut threadably engaging the shaft. A retainer retains the nut assembly adjacent to the outboard bearing to limit axial displacement of the outboard inner ring to maintain the inner ring within the outer ring when the wheel end is separate from the shaft.

20 Claims, 9 Drawing Sheets

(56) References Cited

U.S. PATENT DOCUMENTS

| | | | |
|---|---|---|---|
| 10,589,567 B2* | 3/2020 | Iliev | B60B 27/02 |
| 10,907,689 B2* | 2/2021 | Clark | F16C 33/768 |
| 2011/0062772 A1* | 3/2011 | White | B60B 27/001 |
| | | | 29/446 |
| 2011/0291467 A1* | 12/2011 | Severini | F16C 19/548 |
| | | | 301/105.1 |
| 2020/0200209 A1* | 6/2020 | Coyne | B60B 35/00 |
| 2021/0129582 A1* | 5/2021 | Regan | F16C 43/045 |

FOREIGN PATENT DOCUMENTS

| | | | | |
|---|---|---|---|---|
| CN | 111120491 A | * | 5/2020 | F16B 43/00 |
| DE | 4128508 C1 | * | 10/1992 | B60B 27/001 |
| DE | 19956838 C1 | * | 12/2000 | B60B 27/00 |
| DE | 10057587 A1 | * | 5/2002 | B60B 27/001 |
| JP | 2003278779 A | * | 10/2003 | F16C 19/186 |
| JP | 2010019269 A | * | 1/2010 | F16C 33/7879 |
| WO | WO-0121418 A1 | * | 3/2001 | B60B 27/001 |

* cited by examiner

UNITIZED WHEEL END ASSEMBLY

BACKGROUND OF THE INVENTION

The present invention relates to bearings, and more particularly to wheel end assemblies including bearings.

A wheel end assembly, particularly for truck axles, typically includes a hub connectable with a wheel and two bearings disposed within the hub and mounted to a static shaft, such as a spindle tube. A seal is generally provided in oil lubricated truck axles and wheel ends, with the primary role to retain the axle oil and avoid the leakage thereof. Such seals generally engage against a sleeve mounted on the static spindle axle and have the secondary function of preventing contaminant intrusion into the bearings.

Further, in such wheel ends, the outboard bearing is secured to the tube by a nut assembly, thereby securing the wheel end to the spindle tube. Typically, the hub, the two bearings, the seal and the nut assembly are provided as separate components, with the bearings being provided as a four discrete parts—an inboard cup, an inboard cone, an outboard cup and an outboard cone, that must be individually installed by a customer, such as a vehicle manufacturer.

SUMMARY OF THE INVENTION

In one aspect, the present invention is a wheel end assembly for rotatably coupling a wheel with a shaft of a vehicle. The wheel end assembly comprises a generally cylindrical hub connectable with the wheel and having an inboard axial end, an outboard axial end and an inner circumferential surface defining a bore. An inboard bearing is disposed within the hub bore and includes an outer ring coupled with hub, an inner ring disposed within the outer ring and disposeable about the shaft, and a plurality of rolling elements disposed between the inner and outer rings. A seal assembly is coupled with the inboard bearing inner ring and is configured to retain the inner ring disposed at least partially within the outer ring when the wheel end assembly is separate from the shaft. By providing the seal coupled with the bearing, precise seal placement on the bearing prevents the damage that often occurs when a seal is "blind assembled" to a spindle during mounting of the hub as with prior art assemblies. Further, an outboard bearing is disposed within the hub bore and is spaced from the inboard bearing axially toward the hub outboard end. The outboard bearing includes an outer ring coupled with the hub, an inner ring disposed within the outer ring and disposeable about the shaft and a plurality of rolling elements disposed between the inner and outer rings. Further, a nut assembly is disposed adjacent to the outboard bearing and includes a nut configured to threadably engage an outer surface section of the shaft so as to couple the wheel end assembly with the shaft. A retainer is configured to retain the nut assembly disposed axially adjacent to the outboard bearing such that the nut assembly limits axial displacement of the outboard bearing inner ring to maintain the inner ring disposed at least partially within the outboard bearing outer ring when the wheel end assembly is separate from the shaft.

In another aspect, the present invention is again a wheel end assembly for rotatably coupling a wheel with a shaft of a vehicle. The wheel end assembly comprises a generally cylindrical hub connectable with the wheel and having an inboard axial end, an outboard axial end and an inner circumferential surface defining a bore. A bearing is disposed within the hub bore and includes an outer ring coupled with hub, an inner ring disposed within the outer ring and disposeable about the shaft, and a plurality of rolling elements disposed between the inner and outer rings. A seal assembly is provided to seal an annular space between the bearing inner and outer rings, the seal assembly being configured to retain the inner ring disposed at least partially within the outer ring when the wheel end assembly is separate from the shaft.

In a further aspect, the present invention is once again a wheel end assembly for rotatably coupling a wheel with a shaft of a vehicle. The wheel end assembly comprises a generally cylindrical hub connectable with the wheel and having an inboard axial end, an outboard axial end and an inner circumferential surface defining a bore. A bearing is disposed within the hub bore and includes an outer ring coupled with hub, an inner ring disposed within the outer ring and disposeable about the shaft and a plurality of rolling elements disposed between the inner and outer rings. A nut assembly is disposed adjacent to the bearing and includes a nut configured to threadably engage an outer surface section of the shaft so as to couple the wheel end assembly with the shaft and a washer disposed at least partially between the nut and the bearing inner ring, the nut being movably coupled with the washer. A retainer is coupled with the hub and contactable by the washer to retain the nut assembly disposed axially adjacent to the bearing such that the nut assembly limits axial displacement of the bearing inner ring to maintain the inner ring disposed at least partially within the outer ring when the wheel end assembly is separate from the shaft.

In yet a further aspect, the present invention is also a method of installing a wheel end assembly onto a shaft having a central axis, a free end and an outer circumferential surface with a threaded section. The method comprises the steps of: providing a wheel end assembly including a hub having inboard and outboard ends and a central bore, an inboard bearing disposed within the hub bore and having an outer ring coupled with the hub and an inner ring, a seal configured to retain the inboard bearing inner ring disposed within the inboard bearing outer ring, an outboard bearing disposed within the hub bore and having an outer ring coupled with the hub and an inner ring, a nut assembly disposed adjacent to the outboard bearing and having a nut threadably engageable with the shaft, and a retainer configured to retain the nut assembly adjacent to the outboard bearing so as to retain the outboard bearing inner ring disposed within the outboard bearing outer ring; inserting the free end of the shaft into the inboard end of the hub; displacing the wheel end assembly along the shaft central axis until the shaft extends through the inboard bearing, the outboard bearing and the nut assembly; and rotating the nut about the threaded section of the shaft outer surface to couple the wheel end assembly to the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 8, depicts certain steps in a process of installing the wheel end assembly onto a vehicle shaft.

DETAILED DESCRIPTION OF THE INVENTION

Figure 1:
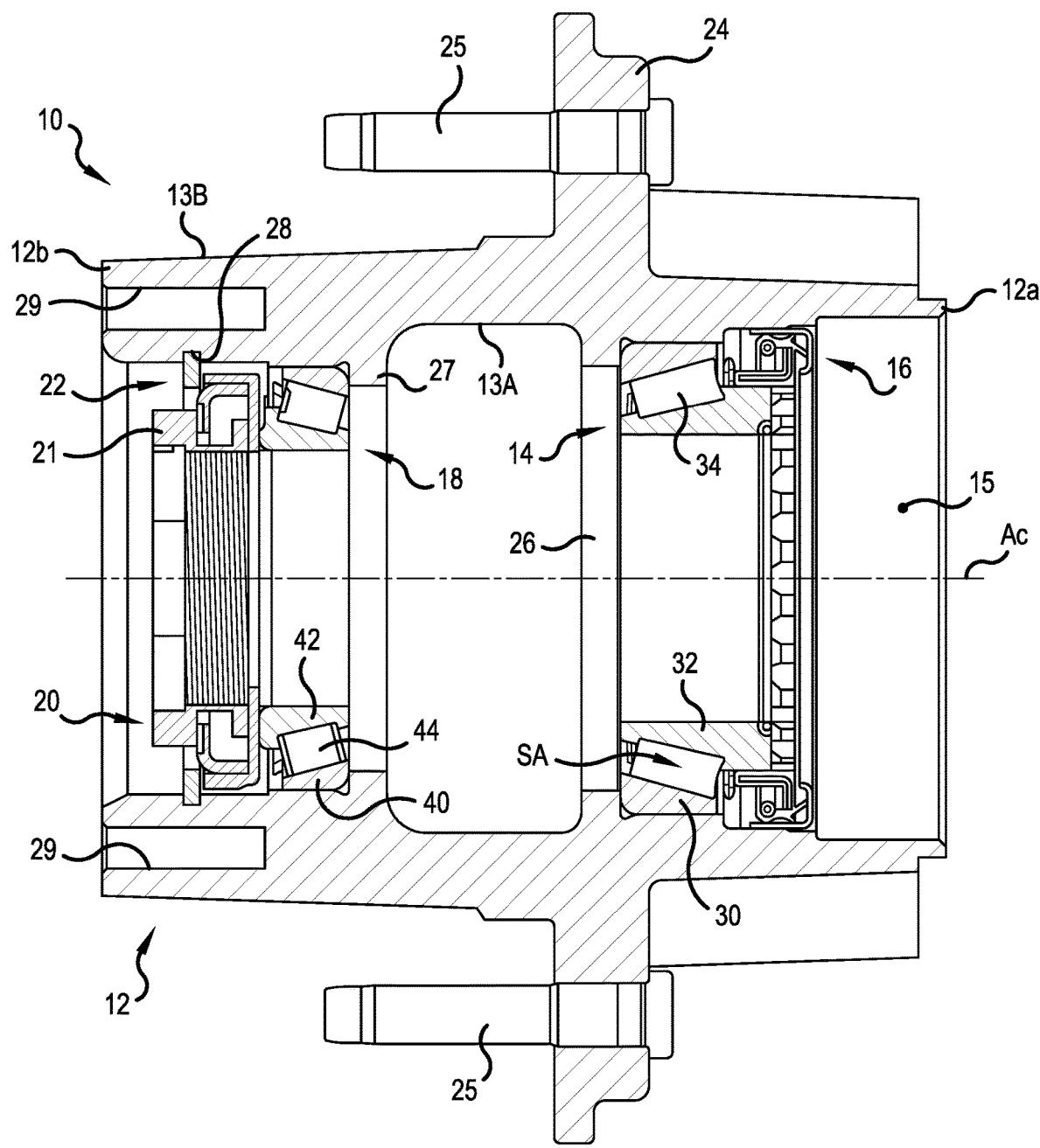
FIG. 1 is an axial cross-sectional view of a wheel end assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a wheel end assembly 10 for rotatably coupling a wheel (not shown) with a shaft 1 (FIG. 8) of a vehicle (not shown), preferably a medium duty truck. The shaft 1 has an outer surface 2 with a threaded section 2a and is preferably a non-rotatable or "fixed" spindle tube of a vehicle, and the wheel is rotatable about a central axis $A_C$ extending through the spindle tube/shaft 1. The wheel end assembly 10 basically comprises a hub 12 connectable with the wheel, an inboard bearing 14, a seal assembly 16 for sealing the inboard bearing 14, an outboard bearing 18, a lock nut assembly 20 for retaining the outboard bearing 18 on the shaft 1 and a retainer 22 for retaining the nut assembly 20. More specifically, the hub 12 is generally cylindrical or tubular and has an inboard axial end 12a, an outboard axial end 12b, an inner circumferential surface 13A defining a bore 15 and an opposing outer circumferential surface 13B. Further, the inboard bearing 14 is disposed within the hub bore 15 and includes an outer ring 30 coupled with the hub 12, an inner ring 32 disposed within the outer ring 30 and disposeable about the shaft 1, and a plurality of rolling elements 34 disposed between the inner and outer rings 32, 30. The seal assembly 16 is provided to seal the annular space SA (FIG. 1) between the bearing outer and inner rings 30, 32 and is configured to retain the inner ring 32 disposed at least partially within the outer ring 30 when the wheel end assembly 10 is separate from the shaft 1. Specifically, the seal assembly 16 is coupled with the bearing inner ring 32 and is configured to seal radially outwardly against the hub inner surface 13A or (preferably) against the inner circumferential surface 65B of a seal member 64 coupled with the hub 15, as described below, to avoid the necessity of sealing against the shaft 1 for reasons discussed below.

Furthermore, the outboard bearing 18 is also disposed within the hub bore 15 and is spaced from the inboard bearing 14 axially toward the hub outboard end 12b. The outboard bearing 18 includes an outer ring 40 coupled with the hub 12, an inner ring 42 disposed within the outer ring 40 and disposeable about the shaft 1 and a plurality of rolling elements 44 disposed between the outer and inner rings 40, 42. Also, the nut assembly 20 is disposed adjacent to the outboard bearing 18 and includes a lock nut 21 configured to threadably engage an outer surface section 2a (FIG. 8) of the shaft 1 so as to couple the wheel end assembly 10 with the shaft 1. The retainer 22 is configured to retain the nut assembly 20 disposed axially adjacent to the outboard bearing 18 such that the nut assembly 20 limits axial displacement of the outboard bearing inner ring 42. Thereby, the retainer 22 maintains the inner ring 42 disposed at least partially within the outboard bearing outer ring 40 when the wheel end assembly 10 is separate from the shaft 1.

Thus, by providing the seal assembly 16 that retains the inboard bearing inner ring 32 within the outer ring 30 and the retainer 22 that both retains the nut assembly 20 and maintains the outboard bearing inner ring 42 within the outer ring 40, the wheel end assembly 10 of the present invention provides a "unitary" wheel end. That is, all required components of the wheel end 10 may be preassembled within the hub 12 and the shipped to a customer, such as an original equipment manufacturer ("OEM"), in a state that is ready to be installed directly onto a spindle shaft 1, as discussed in greater detail below. Also, as the preferred bearings 14, 18 are angular contact bearings arranged with outwardly facing cups, as discussed below, the ability to retain the inner rings 32, 42 "in place" during transport is particularly beneficial.

Further, by having the inboard seal assembly 16 mounted on the bearing 14 and sealing radially outwardly, as opposed to inwardly against the shaft outer surface 2 as with prior art devices, the seal 16 is completely supported and precisely installed prior to the mounting of the wheel end assembly 10 on the shaft 1. As such, the potential for damage caused by impact with the shaft/spindle 1, as may occur when the shaft 1 passes through the inner perimeter of an "unsupported" inwardly-sealing prior art seal assembly, is eliminated. Having discussed the basic components and structure above, these and other aspects of the present invention are described in greater details below.

Figure 2:
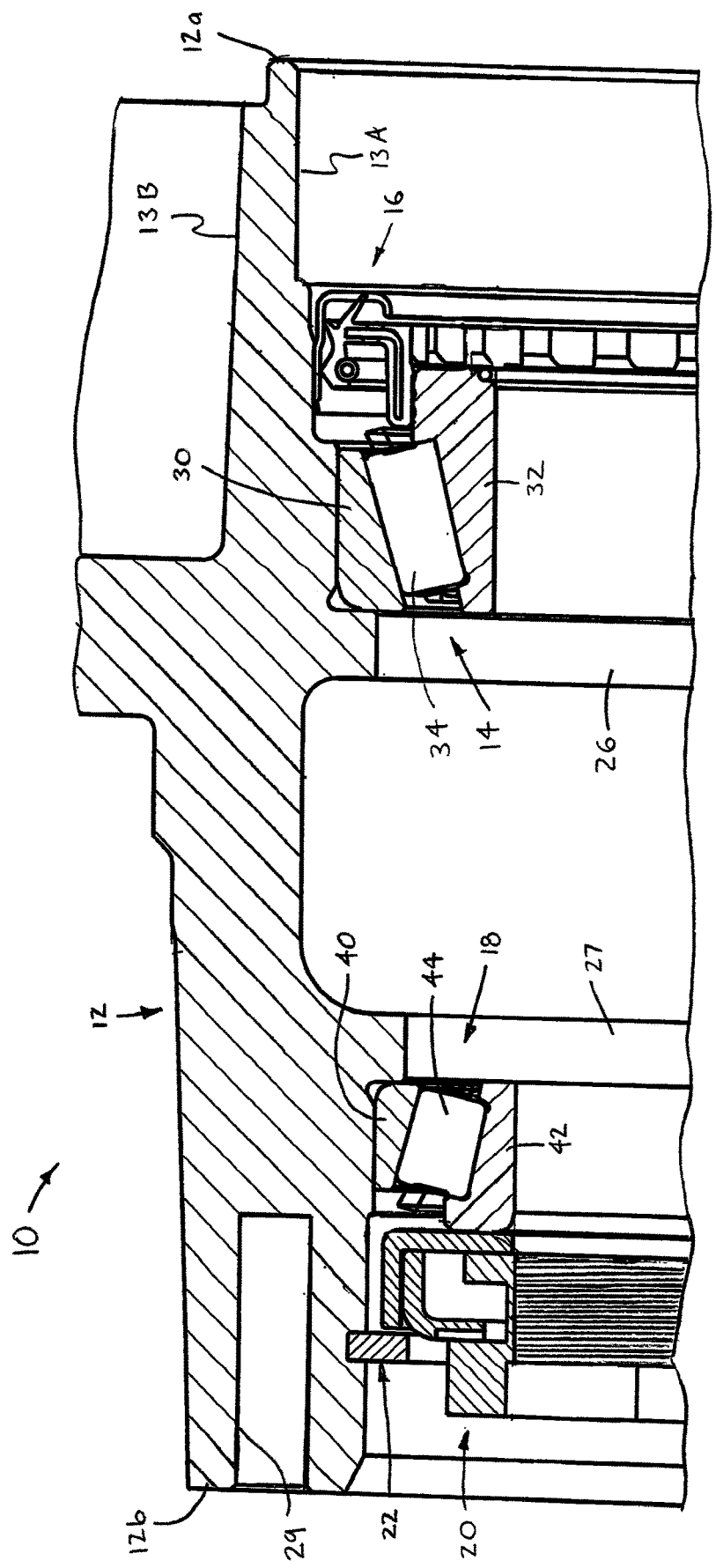
FIG. 2 is an enlarged, broken-away view of an upper portion of FIG. 1.

Referring to FIGS. 1 and 2, the hub 12 preferably has a central annular flange 24 extending radially outwardly from the outer surface 13B and attachable to the wheel by a plurality of bolts 25 (FIG. 1). As such, the hub 12, and the bearing outer rings 30, 40 coupled with the hub 12, are rotatable about the central axis $A_C$. Preferably, the hub 12 includes two annular shoulders 26, 27 each extending radially inwardly from the hub inner surface 13A and spaced axially apart. Each shoulder 26, 27 locates and axially retains a separate one of the bearing outer rings 30, 40, respectively. Further, an annular groove 28 extends radially outwardly from the hub inner surface 13A and is provided to receive the preferred retainer 22, as described below. Furthermore, the outboard end 12b of the hub 12 preferably has a plurality of mounting holes 29 for coupling a shaft flange 6 to the hub 12, as described below.

Figure 3:
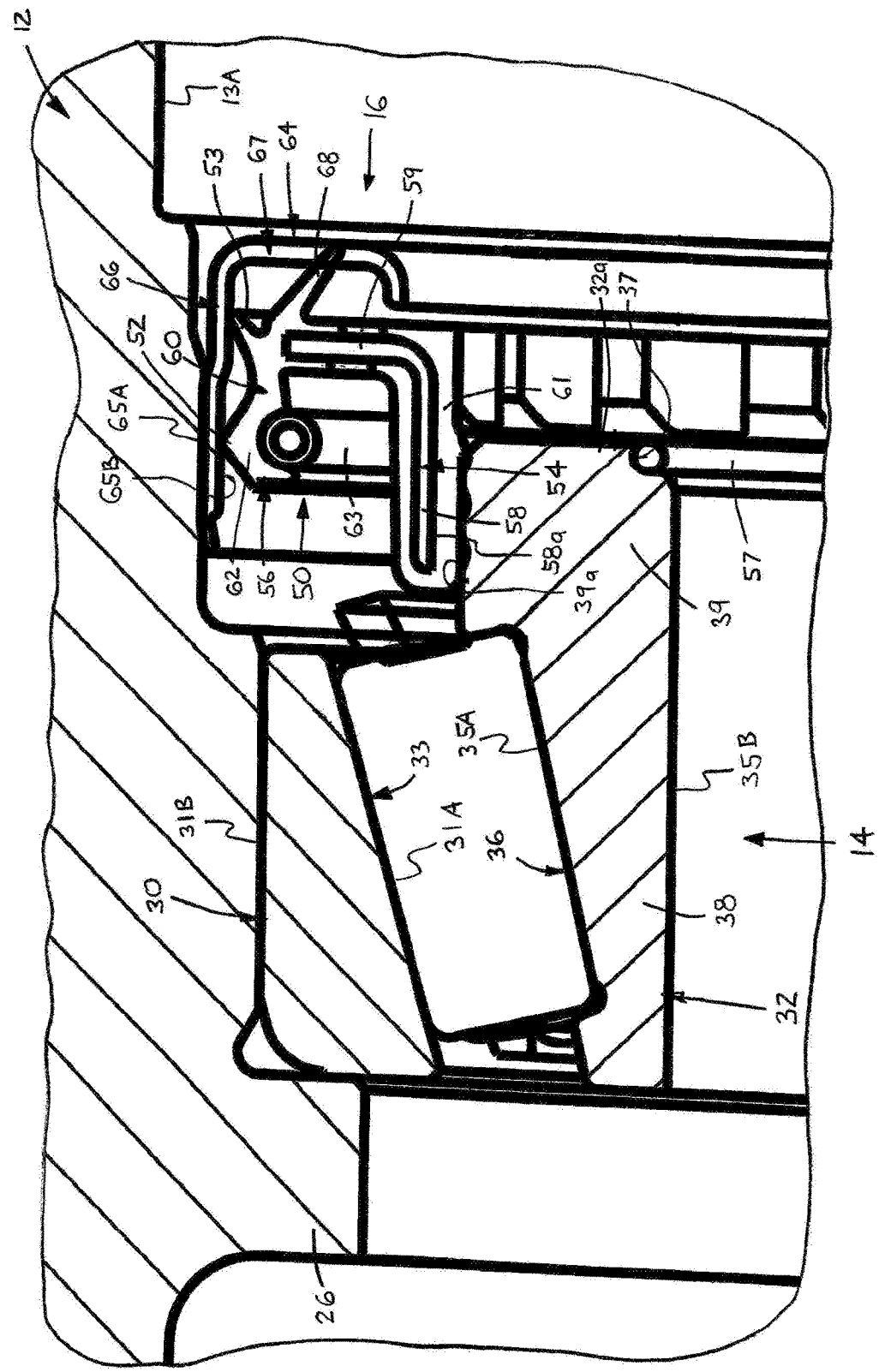
FIG. 3 is a more enlarged, broken-away view of a portion of FIG. 1, showing an inboard bearing and a seal assembly.

Referring now to FIGS. 1-3, the inboard bearing 14 is preferably formed as a tapered roller bearing in which the outer ring 30 is formed as a "cup" providing a conical outer race 33, the inner ring 32 is formed as a "cone" providing a conical inner race 36 and the rolling elements 34 are taper rollers which each roll simultaneously upon the races 33, 36. More specifically, the outer ring 30 has an angled inner circumferential surface section 31A providing the bearing outer race 33 and a cylindrical outer circumferential surface 31B. The ring outer surface 31B is preferably frictionally engaged (e.g., press-fit) with the inner surface 13A of the hub 12, with the ring 30 disposed against the inboard hub shoulder 26, to mount the outer ring 30 to the hub 12. Preferably, the outer ring 30 is arranged with respect to the hub 12 such that angled inner circumferential surface 31A, and thus the outer race 33, faces generally toward the hub inboard axial end 12a.

Further, the bearing inner ring 32 has an angled outer circumferential surface section 35A providing a bearing inner race 36 and a cylindrical inner circumferential surface 35B sized to be frictionally engageable with the shaft outer surface 2 to mount the inner ring 32 to the shaft 1. Preferably, the inner ring 32 has an annular groove 37 (FIG. 3) extending radially-inwardly from the inner surface 35B adjacent to an inboard-facing end 32a and an annular sealing member 57 (e.g., an O-ring) disposed within the groove 37. The annular sealing member 57 seals against the outer surface 2 of the shaft 1 when the wheel end assembly 10 is installed on the shaft 1 so as to prevent fluid leakage (e.g., of oil) between the inner ring 32 and the shaft 1. Furthermore, the inner ring 32 preferably has an annular shoulder 39 extending axially from an angled body portion 38 that provides the inner race 36, the shoulder 39 having a cylindrical outer surface 39a. The inner ring 32 is arranged within the hub 12 such that the angled outer surface section 35A (and inner race 36) faces generally away from the hub inboard axial end 12a.

With this type and arrangement of the inboard bearing 14, the bearing inner ring 32 will axially displace toward the hub inboard axial end 12a, i.e., without the present sealing assembly 16, whenever there is any downward inclination of the inboard end 12a relative to the hub outboard end 12b. Such a displacement of the inner ring 32 may result in the ring 32 and the rolling elements 34 becoming disengaged from each other and the outer ring 30 and thereafter potentially falling outwardly through the hub inboard end 12a. However, due to the seal assembly 16 providing the secondary function (i.e., besides sealing) of retaining the bearing inner ring 32 within the outer ring 30, as described in detail below, these potential adverse effects are eliminated.

Referring to FIGS. 1-5, the seal assembly 16 is disposed axially between the bearing outer ring 30 and the hub inboard end 12a and is preferably coupled with the bearing inner ring 32 and sealingly engageable with the hub 12 (FIG. 5) or with a seal member 64 (FIGS. 1-4) coupled with the hub 12. Such sealing engagement substantially prevents axial displacement of the inner ring 32 when the wheel end assembly 10 is separate from the shaft 1. Alternatively, the seal assembly 16 may be coupled with the hub 12 and sealingly engageable with the inner ring 32 to prevent inner ring displacement (structure not shown). In either case, the seal assembly 16 has sufficient frictional engagement of a sealing member 50, described below, to maintain the bearing inner ring 32 located at particular axial position (i.e., within the outer ring 30).

Figure 4:
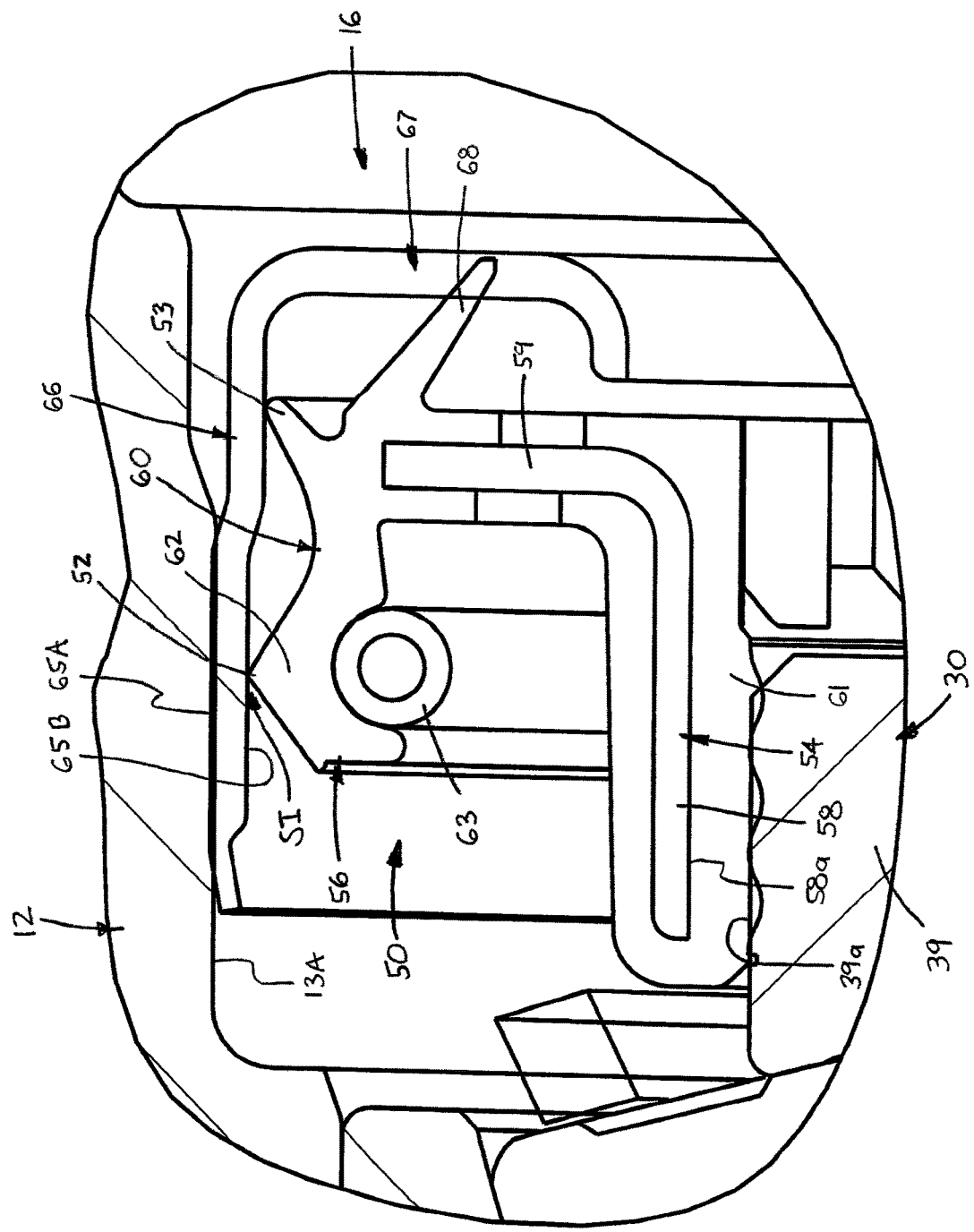
FIG. 4 is an enlarged view of a portion of FIG. 3, showing the seal assembly.
Figure 5:
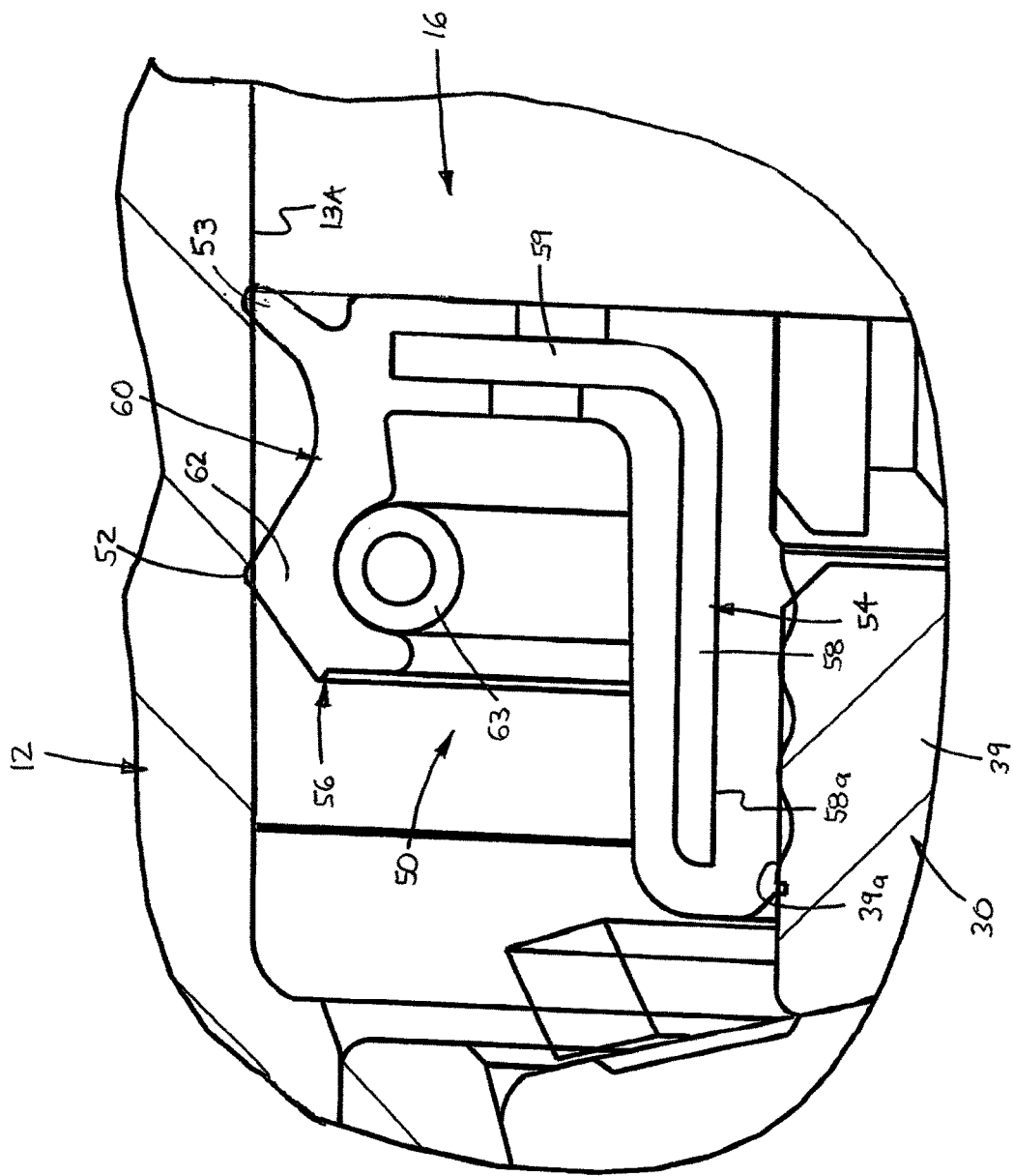
FIG. 5 is an enlarged view of the seal assembly showing an alternative construction without a seal cover member.

Referring to FIGS. 3-5, the seal assembly 16 preferably includes an annular sealing member 50 disposed about the outer surface 39a of the inner ring shoulder 39 and having an outer circumferential sealing lip 52. As such, the sealing member 50 is non-rotatable or fixed with respect to the central axis $A_C$ and seals radially outwardly against a rotating inner circumferential surface 65B, as described below. The sealing member 50 preferably includes an annular rigid base component 54 coupled with the inner ring 32 and an annular elastomeric seal component 56 coupled with the base component 54 and providing the lip 52. More specifically, the base component 54 has an axial portion 58 disposed about the shoulder 39 of the bearing inner ring 32 and a radial portion 59 extending outwardly from the axial portion 58, such that the base component 54 has generally L-shaped axial cross-sections. The base component axial portion 58 has an inner circumferential surface 58a and an elastomeric layer 61 is preferably disposed on the inner surface 58a to seal between the sealing member 50 and the inner ring shoulder 39.

Further, the seal component 56 includes a main cantilever portion 60 extending generally axially from the radial portion 59 of the base component 54 and has an outer circumferential, wedge-shaped section 62 providing the sealing lip 52. The seal component 56 also preferably includes a secondary outer circumferential sealing lip 53 spaced axially from the primary sealing lip 52. Preferably, the seal assembly 16 further includes an annular biasing member 63, preferably a garter spring, configured to radially-outwardly bias the cantilever portion 60 of the elastomeric seal component 56 to maintain adequate sealing pressure at the main sealing interface SI (FIG. 4).

Referring now to FIGS. 3 and 4, the seal assembly 16 preferably further includes an annular cover member 64 disposed at least partially about and enclosing the sealing member 50. The cover member 64 has an outer circumferential surface 65A frictionally engaged with the hub inner surface 13A so as to mount the cover member 64 to the hub 12 and an opposing inner circumferential surface 65B. The sealing lip 52 is sealingly engaged with the cover member inner surface 65B, and thus the seal assembly 16 with the cover member 64 eliminates the need for providing a machined surface for seal engagement. Further, the cover member 64 preferably has generally L-shaped axial cross-sections and includes an axial portion 66 providing the inner and outer circumferential surfaces 65A, 65B and a radial portion 67 extending inwardly from the axial portion 66. The cover member radial portion 67 is spaced axially from the inboard bearing outer ring 30 such that the sealing member 50 is disposed axially between the bearing outer ring 30 and the cover member radial portion 67. Furthermore, the elastomeric component 56 of the sealing member 50 preferably further includes a generally axially extending lip 68 sealingly engageable with the cover radial portion 67, which reduces the amount of contaminants, particularly solid particles, which reach the primary sealing interface SI.

Thus, the seal assembly 16 as described above is preferably provided as a "cassette" type of seal in which the all components of the seal assembly 16 are enclosed within inner and outer members and installable as a single unit, in this case between the ring shoulder 39 and the hub 12. This eliminates the necessity of an end customer to machine the shaft outer surface 2 in order to provide a smooth, continuous running surface for the inboard seal. However, the seal assembly 16 may be provided without the cover member 64, in which the sealing lip 52 seals against the hub inner surface 13A or even against the shoulder outer surface 39a (i.e., with appropriately formed base component coupled with the hub 12). The scope of the present invention encompasses all variations of the seal assembly 16 capable of retaining the inboard bearing inner ring 32 disposed within the bearing outer ring 30 when the wheel end assembly 10 is separate from the shaft 1.

Figure 6:
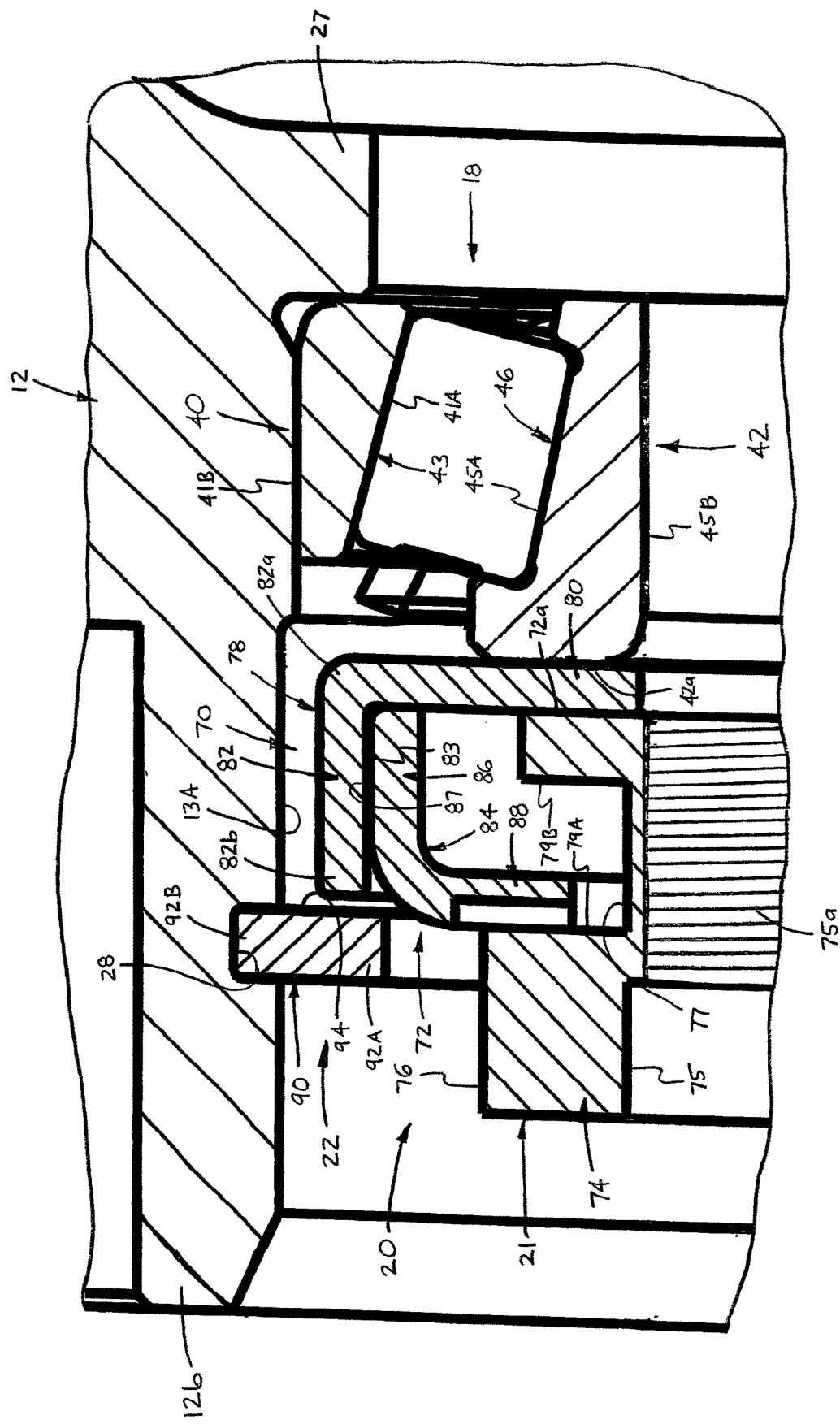
FIG. 6 is a more enlarged, broken-away view of a portion of FIG. 1, showing an outboard bearing and a retainer.

Referring now to FIGS. 1, 2 and 6, as with the inboard bearing 14, the outboard bearing 18 is preferably formed as a tapered roller bearing in which the outer ring 40 is formed as a cup providing a conical outer race 43, the inner ring 42 is formed as a cone providing a conical inner race 46 and the rolling elements 44 are taper rollers which each roll simultaneously upon the races 43, 46. More specifically, the outer ring 40 has an angled inner circumferential surface section 41A providing the bearing outer race 43 and a cylindrical outer circumferential surface 41B. The ring outer surface 41B is preferably frictionally engaged (e.g., press-fit) with the inner surface 13A of the hub 12, with the ring 40 disposed against the outboard hub shoulder 27, to mount the outer ring 40 to the hub 12. Preferably, the outer ring 40 is arranged with respect to the hub 12 such that angled inner circumferential surface 41A, and thus the outer race 43, faces generally toward the hub outboard axial end 12b.

Further, the bearing inner ring 42 has an angled outer circumferential surface section 45A providing the bearing inner race 46 and a cylindrical inner circumferential surface 45B sized to be frictionally engageable with the shaft outer surface 2 to mount the inner ring 42 onto the shaft 1. The inner ring 42 is arranged within the hub 12 such that the angled outer surface section 45A (and inner race 46) faces generally away from the hub outboard end 12b. For the same reasons as the inboard bearing 14, the preferred structure and arrangement of the outboard bearing 18 would permit the inner ring 42 to axially displace outwardly from within the outer ring 40, i.e., in the absence of the retainer 22, when the wheel end assembly 10 is in an uninstalled state and the hub outboard end 12b is inclined downwardly with respect to the inboard end 12a. However, such displacement is prevented by the nut assembly 20 and the retainer 22, as described below.

Figure 7:
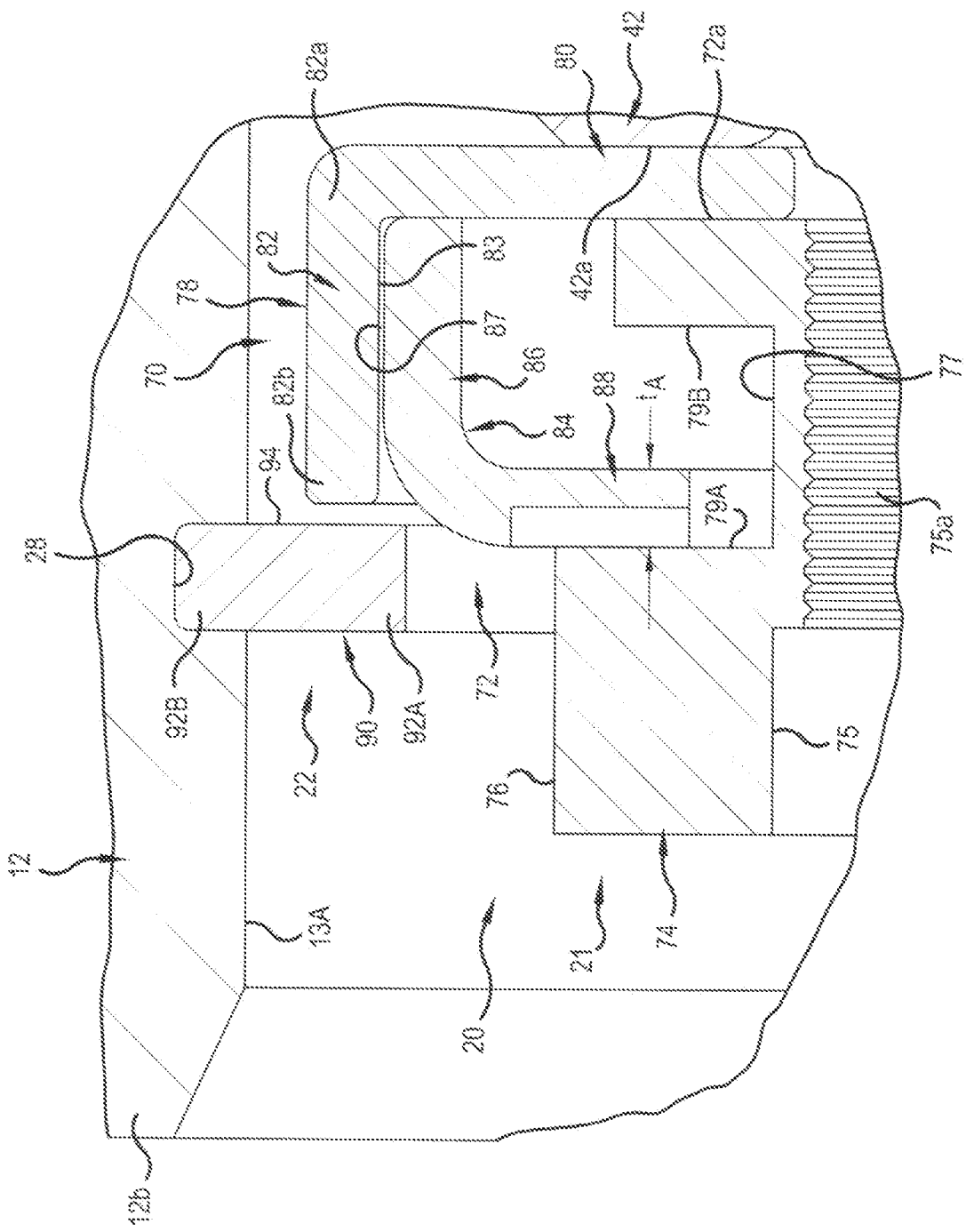
FIG. 7 is an enlarged view of portion of FIG. 6, showing the retainer and a nut assembly.
Figure 8A:
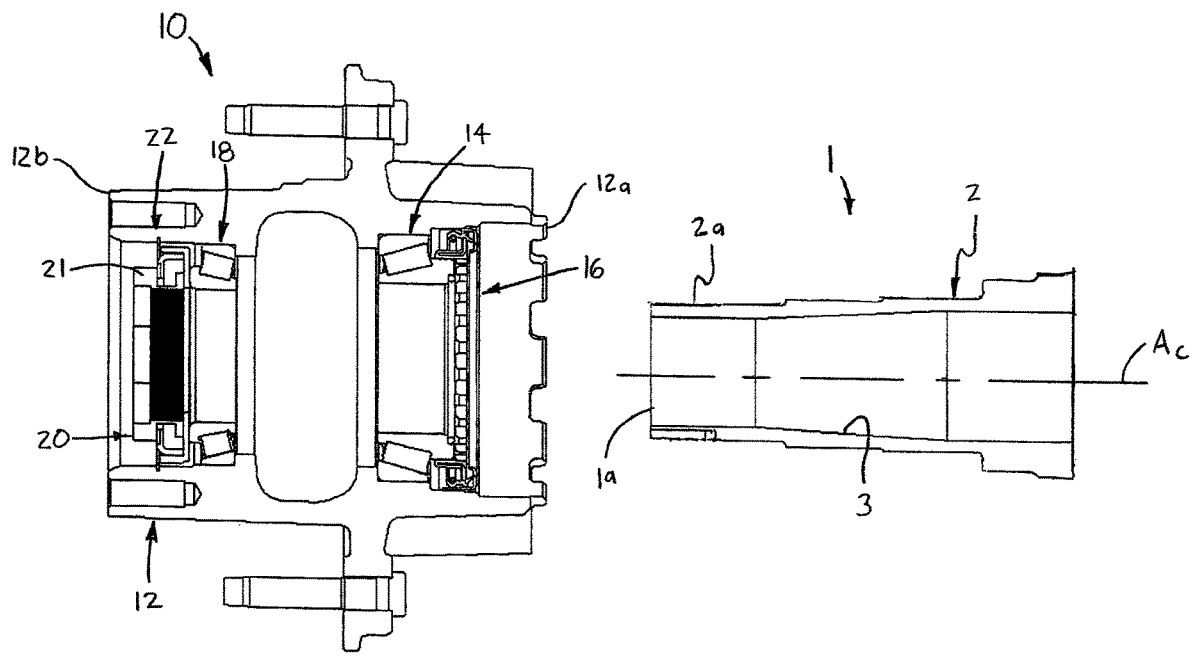
FIGS. 8A-8D, collectively
Figure 8B:
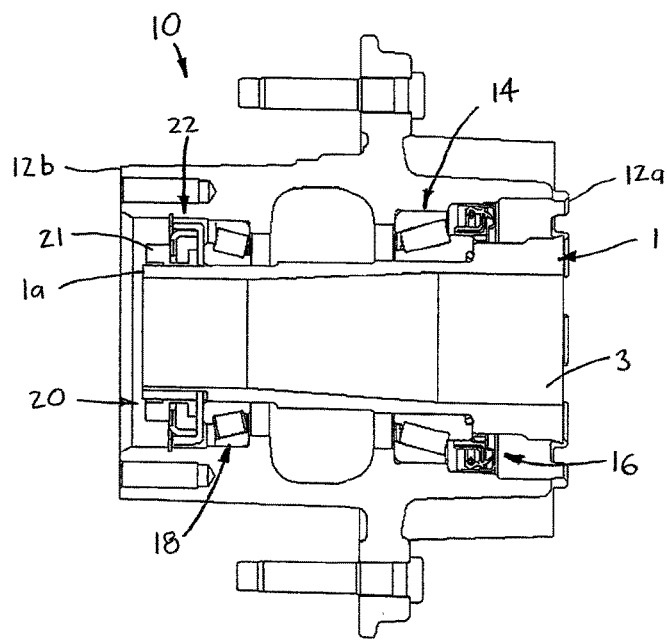
Figure 8C:
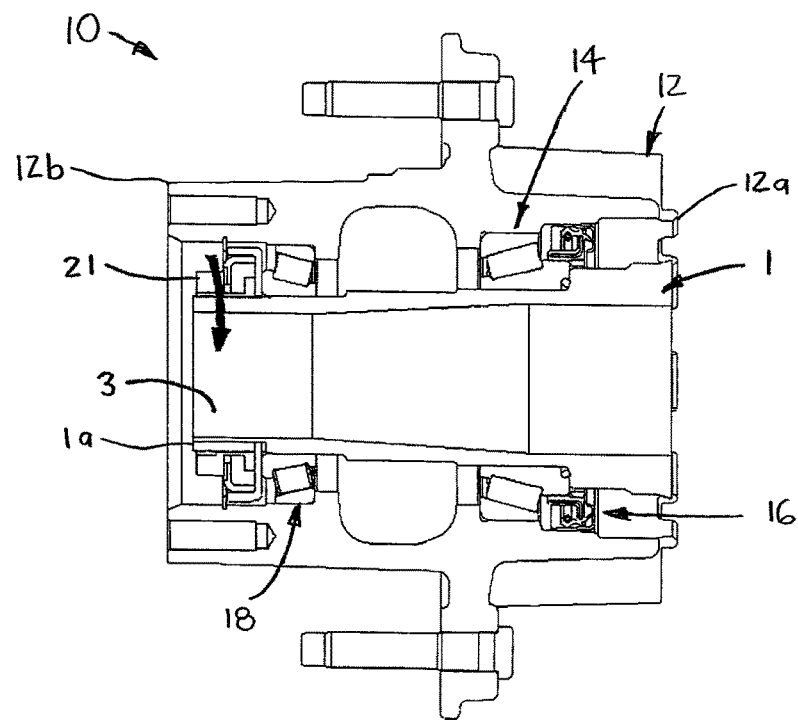
Figure 8D:
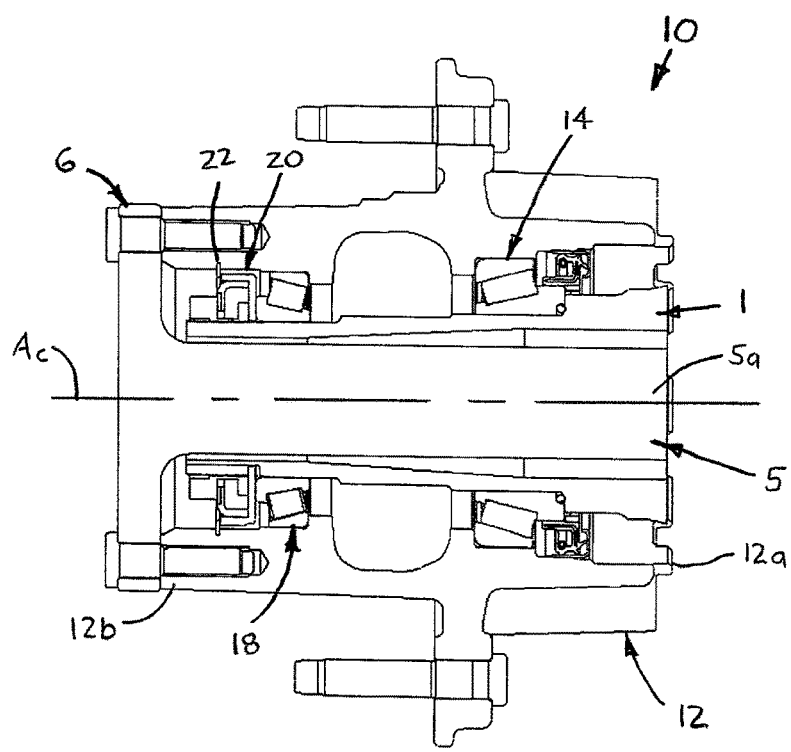

Referring now to FIGS. 6 and 7, the nut assembly 20 is disposed axially adjacent to the outboard bearing 18, so as to be disposed between the bearing 18 and the hub outboard end 12b, and includes, in addition to the lock nut 21, a washer 70 and a keeper 72, as described below. The nut 21 includes a generally cylindrical body 74 having an inner circumferential surface 75 with a threaded section 75a, an opposing outer circumferential surface 76 and an annular groove 77. The nut groove 77 extends radially-inwardly from the outer surface 76 and is partially defined by facing radial surfaces 79A, 79B. The washer 70 is disposed at least partially between the nut 21 and the bearing inner ring 42, such that the washer 70 is clampable therebetween, and the nut 21 is movably coupled with the washer 70, preferably by the keeper 72 as discussed below, so that the nut 21 is axially displaceable relative to the washer 70. More specifically, the washer 70 includes a generally L-shaped annular body 78 with an inner radial portion 80 disposed axially between the nut 21 and the bearing inner ring 42 and an outer axial portion 82. The washer axial portion 82 has a first end 82a integrally formed with the radial portion 80 and an opposing, free second end 82b engageable with the retainer 22, as described below, and extends axially in a direction away from the outboard bearing 18. Also, the radial portion 80 of the washer 70 preferably includes a radially-inwardly extending tab (not shown) disposeable within an axially extending groove (not depicted) in the shaft outer surface 2 to prevent rotation of the washer 70 about the central axis $A_C$.

Further, the keeper 72 includes a generally annular body 84 with an outer axial portion 86 coupled with the washer 70 and an inner radial portion 88 disposed at least partially within the nut groove 77, to thereby couple the washer 70 with the nut 21. Specifically, the keeper axial portion 86 is sized diametrically lesser than the washer axial portion 82 and has an outer circumferential surface 87 frictionally engaged with an inner circumferential surface 83 of the washer axial portion 82. Furthermore, the nut groove 77 is sized such that the axial distance (not indicated) between the facing radial surfaces 79A, 79B is substantially larger than the axial thickness to (FIG. 7) of the keeper radial portion 88 so that the nut 21 is movably coupled with the washer 70. As such, to install the nut assembly 20 on the shaft 1, the washer 70 is juxtaposed against the outboard end 42a of the outboard bearing inner ring 42 and then the nut 21 is rotated about the threaded section 2a of the shaft outer surface 2 until the nut body inner end 72a clamps against the washer radial portion 80.

Still referring to FIGS. 6 and 7, the retainer 22 is disposed axially between the outboard bearing 18 and the hub outboard end 12b and is contactable by the washer 70 to limit axial displacement of the washer 70 and thereby also the nut 21. More specifically, the retainer 22 preferably includes an annular plate 90 with an inner radial end 92A, an outer radial end 92B and a radial stop surface 94 and is most preferably generally formed as a conventional C-clip. The outer radial end 92B is disposed within the hub annular groove 28 to couple the retainer 22 with the hub 12 and the inner radial end 92A is spaced radially outwardly from the nut 21. Further, the retainer 22 is located such that the radial stop surface 94 is contactable by the washer 70, specifically the free end 82b of the washer axial portion 82. Such contact between the washer end 82b and the retainer surface 94 causes the washer radial portion 80 to substantially prevent axial displacement of the outboard bearing inner ring 42, thus maintaining the inner ring 42 disposed at least partially within the outer ring 40.

Referring to FIGS. 8A-8D, the wheel end assembly 10 of the present invention enables a unitary wheel end to be provided to a customer for simple installation onto a spindle shaft 1 of a vehicle. That is, by providing a unitary wheel end assembly 10 that includes the inboard bearing 14 retained by the installed seal assembly 16 and the outboard bearing 18 and the nut assembly 20 retained by the retainer 22, the wheel end assembly 10 may be installed by inserting the shaft or spindle tube 1 into the wheel end assembly 10, rotating the nut 21 to secure the wheel end assembly 10 onto the shaft 1, inserting an axle shaft 5 through the outboard end 12b of the hub 12 and into the bore 3 of the shaft/spindle tube 1, and then attaching a flange 6 of the shaft 5 to the outboard end 12b of the hub 12.

More specifically, the provided wheel end assembly 10 is disposed adjacent to the spindle shaft 1, and then displaced toward the shaft 1 such that the free end 1a of the spindle shaft 1 is inserted into the inboard end 12a of the hub 12. The wheel end assembly 10 is displaced along the shaft central axis $A_C$ until the shaft 1 extends through the inboard bearing 14, the outboard bearing 18 and the nut assembly 20. Next, the lock nut 21 is rotated about the threaded section 2a of the shaft outer surface 2 to couple the wheel end assembly 10 to the shaft 1. Preferably, the nut 21 is tightened against the washer 70 to establish a desired preload or end-play with the outboard bearing 18. Then, a first, free end 5a of the axle shaft 5 is inserted into the hub outboard end 12b and through the free end 1a of the spindle shaft 1 and into the shaft bore 3. The axle shaft 5 is displaced along the shaft central axis $A_C$ until the flange 6 of the axle shaft 5 is disposed against the hub outboard end 12b. Finally, the shaft flange 6 is coupled with the hub outboard end 12b to fully secure the wheel end assembly 10 onto the spindle shaft 1. And when it is desired to service or replace the wheel end assembly 10, the nut 21 may be loosened from the shaft 1, and is thereafter retained by the retainer 22, such that the wheel end assembly 10 may then be extracted from the shaft 1 as an entire unit.

The wheel end assembly 10 of the present invention has a number of advantages over previously known wheel end assemblies, in addition to the simplified installation as discussed above. Due to providing the seal assembly 16 as a cassette type of seal pre-installed within the hub 12 and supported on the bearing inner ring 32, potential damage to the sealing member 50 during customer installation is eliminated and no machining of a seal running surface on the shaft 1 is required. By sealing radially-outwardly, the sealing member 50 is better lubricated by centrifugal action, resulting in lower wear, reduced friction, lower running temperature and longer life, as well as increasing sealing efficiency as lubricants will tend to accumulate on the inner surface 13A of the rotating hub 12. Further, the cassette seal assembly 16 with the sealing member 50 sealing against the outer cover member 64 enables more accurate installation of the seal assembly 16 within the hub 12 and eliminates potential damage to the seal during assembly and removal of the wheel end 10, and thus provides the potential ability to reuse the seal assembly 16. Also, the seal assembly 16 may be constructed without any bumper or other device to maintain relative positioning of the cassette components during installation of the wheel end assembly 10 on the shaft 1, thereby reducing friction and resultant heat during sealing as well as eliminating the possibility of portions of such a bumper/device abrading away or shearing off and thereafter entering the seal lip interface. Furthermore, by having the retainer 22 retaining the lock nut assembly 20, and thereby the outboard bearing inner ring 42, the hub 12 and the bearing assemblies 14, 18 are capable of being extracted from the shaft 1 as a single unit.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A wheel end assembly for rotatably coupling a wheel with a shaft of a vehicle, the wheel end assembly comprising:
   a generally cylindrical hub connectable with the wheel and having an inboard axial end, an outboard axial end and an inner circumferential surface defining a bore;
   an inboard bearing disposed within the hub bore and including an outer ring coupled with hub, an inner ring disposed within the outer ring and disposeable about the shaft, and a plurality of rolling elements disposed between the inner and outer rings;
   a seal assembly coupled with the inboard bearing inner ring and configured to retain the inner ring disposed at least partially within the outer ring when the wheel end assembly is separate from the shaft;
   an outboard bearing disposed within the hub bore and spaced from the inboard bearing axially toward the hub outboard end, the outboard bearing including an outer ring coupled with the hub, an inner ring disposed within the outer ring and disposeable about the shaft and a plurality of rolling elements disposed between the inner and outer rings;
   a nut assembly disposed adjacent to the outboard bearing and including a nut configured to threadably engage an outer surface section of the shaft so as to couple the wheel end assembly with the shaft; and
   a retainer configured to retain the nut assembly disposed axially adjacent to the outboard bearing such that the nut assembly limits axial displacement of the outboard bearing inner ring to maintain the inner ring disposed at least partially within the outboard bearing outer ring when the wheel end assembly is separate from the shaft.

2. A wheel end assembly for rotatably coupling a wheel with a shaft of a vehicle, the wheel end assembly comprising:
   a generally cylindrical hub connectable with the wheel and having an inboard axial end, an outboard axial end and an inner circumferential surface defining a bore;
   a bearing disposed within the hub bore and including an outer ring coupled with hub, an inner ring disposed within the outer ring and disposeable about the shaft, the inner ring having a shoulder with an outer circumferential surface, and a plurality of rolling elements disposed between the inner and outer rings; and
   a seal assembly for sealing an annular space between the bearing inner and outer rings, the seal assembly being disposed on the outer circumferential surface of the shoulder of the bearing inner ring and engageable with the hub so as to retain the inner ring disposed at least partially within the outer ring when the wheel end assembly is separate from the shaft.

3. The wheel end assembly as recited in claim 2 wherein the seal assembly is coupled with the bearing inner ring and is sealingly engageable with the hub or with a seal member coupled with the hub so as to substantially prevent axial displacement of the inner ring when separate from the shaft.

4. The wheel end assembly as recited in claim 3 wherein:
   the bearing inner ring has a shoulder with an outer circumferential surface; and
   the seal assembly includes an annular sealing member disposed about the outer surface of the inner ring shoulder and having an outer circumferential sealing lip.

5. The wheel end assembly as recited in claim 4 wherein the annular sealing member includes:
   an annular rigid base component having an axial portion disposed about the shoulder of the bearing inner ring and a radial portion extending radially-outwardly from the axial portion; and
   an annular elastomeric seal component coupled with the base component and including a cantilever portion extending generally axially from the radial portion of the base component and having an outer circumferential, wedge-shaped section providing the sealing lip.

6. The wheel end assembly as recited in claim 5 wherein the seal assembly further includes an annular cover member disposed at least partially about the sealing member, the cover member having an outer circumferential surface frictionally engaged with the hub inner surface and an opposing inner circumferential surface, the sealing lip being sealingly engaged with the cover member inner surface.

7. The wheel end assembly as recited in claim 6 wherein:
   the seal cover member includes an axial portion providing the inner and outer circumferential surfaces and a radial portion extending inwardly from the axial portion and spaced axially from the bearing outer ring such that the sealing member is disposed between the bearing outer ring and the cover member radial portion; and
   the annular elastomeric seal component further includes a generally axially extending lip engageable with the cover radial portion.

8. The wheel end assembly as recited in claim 5 wherein:
the axial portion of the seal cover member has an inner circumferential surface and an elastomeric layer disposed on the inner surface, the elastomeric layer sealing between the seal cover member and the inner ring shoulder; and
the seal assembly further includes an annular biasing member configured to radially-outwardly bias the cantilever portion of the seal elastomeric component.

9. The wheel end assembly as recited in claim 2 wherein:
the bearing outer ring is formed as a bearing cup having an angled inner circumferential surface section facing generally toward the hub inboard axial end and providing a bearing outer race;
the bearing inner ring is formed as a bearing cone having an angled outer circumferential surface section facing generally away from the hub inboard end and providing a bearing inner race;
each one of the rolling elements is formed as a taper roller and is configured to roll simultaneously upon the outer and inner bearing races; and
the seal assembly is disposed axially between the bearing outer ring and the hub inboard end.

10. The wheel end assembly as recited in claim 2 wherein the bearing is an inboard bearing and the wheel end assembly further comprises:
an outboard bearing spaced axially from the inboard bearing such that the outboard bearing is disposed axially between the inboard bearing and the hub outboard axial end, the outboard bearing including an outer ring coupled with hub, an inner ring disposed within the outer ring and a plurality of rolling elements disposed between the inner and outer rings;
a nut assembly disposed adjacent to the outboard bearing and including a nut configured to threadably engage an outer surface section of the shaft to couple the wheel end assembly with the shaft; and
a retainer configured to retain the nut assembly disposed axially adjacent to the outboard bearing such that the nut assembly limits axial displacement of the outboard bearing inner ring to maintain the inner ring disposed at least partially within the outboard bearing outer ring when the wheel end assembly is separate from the shaft.

11. The wheel end assembly as recited in claim 2 further comprising an annular sealing member coupled with the bearing inner ring and configured to seal against the shaft outer surface to prevent leakage between the inner ring and the shaft.

12. A wheel end assembly for rotatably coupling a wheel with a shaft of a vehicle, the wheel end assembly comprising:
a generally cylindrical hub connectable with the wheel and having an inboard axial end, an outboard axial end and an inner circumferential surface defining a bore;
a bearing disposed within the hub bore and including an outer ring coupled with hub, an inner ring disposed within the outer ring and disposeable about the shaft and a plurality of rolling elements disposed between the inner and outer rings;
a nut assembly disposed adjacent to the bearing and including a nut configured to threadably engage an outer surface section of the shaft so as to couple the wheel end assembly with the shaft and a washer disposed at least partially between the nut and the bearing inner ring, the nut being movably coupled with the washer; and
a retainer coupled with the hub and contactable by the washer to retain the nut assembly disposed axially adjacent to the bearing such that the nut assembly limits axial displacement of the bearing inner ring to maintain the inner ring disposed at least partially within the outer ring when the wheel end assembly is separate from the shaft.

13. The wheel end assembly as recited in claim 12 wherein:
the nut has an outer circumferential surface and an annular groove extending radially-inwardly from the outer surface;
the washer includes an annular body with an inner radial portion disposed axially between the nut and the bearing inner ring and an outer axial portion having a first end integrally formed with the radial portion and an opposing, free second end engageable with the retainer; and
the nut assembly further includes an annular keeper having an outer axial portion coupled with the washer and an inner radial portion disposed at least partially within the nut groove to couple the washer with the nut.

14. The wheel end assembly as recited in claim 12 wherein:
the hub has an annular groove extending radially-outwardly from the hub inner surface; and
the retainer includes an annular plate disposed about the nut and having an outer radial end disposed within the hub annular groove, an inner radial end spaced radially outwardly from the nut and a radial surface contactable by the washer.

15. The wheel end assembly as recited in claim 12 wherein:
the bearing outer ring is formed as a bearing cup having an angled inner circumferential surface section facing generally toward the hub outboard axial end and providing a bearing outer race;
the bearing inner ring is formed as a bearing cone having an angled outer circumferential surface section facing generally away from the hub outboard end and providing a bearing inner race;
each one of the rolling elements is formed as a taper roller and is configured to roll simultaneously upon the outer and inner bearing races; and
the retainer is disposed axially between the bearing and the hub outboard end.

16. A method of installing a wheel end assembly onto a spindle shaft having a central axis, a free end and an outer circumferential surface with a threaded section, the method comprising the steps of:
providing a wheel end assembly including a hub having inboard and outboard ends and a central bore, an inboard bearing disposed within the hub bore and having an outer ring coupled with the hub and an inner ring, a seal configured to retain the inboard bearing inner ring disposed within the inboard bearing outer ring, an outboard bearing disposed within the hub bore and having an outer ring coupled with the hub and an inner ring, a nut assembly disposed adjacent to the outboard bearing and having a nut threadably engageable with the shaft, and a retainer engaged with the hub and configured to retain the nut assembly adjacent to the outboard bearing so as to retain the outboard bearing inner ring disposed within the outboard bearing outer ring when the wheel end assembly is separate from the shaft;

inserting the free end of the spindle shaft into the inboard end of the hub;

displacing the wheel end assembly along the shaft axis until the shaft extends through the inboard bearing, the outboard bearing and the nut assembly; and rotating the nut about the threaded section of the spindle shaft outer surface to couple the wheel end assembly to the shaft.

17. The method as recited in claim 16 wherein the step of rotating the nut includes establishing a desired preload or end-play within the outboard bearing.

18. The method as recited in claim 16 wherein the spindle shaft has an interior bore and the method further comprises the steps of:

providing an axle shaft having a first end and an opposing second end with an annular flange;

inserting the first end of the axle shaft into the hub outboard end, through the spindle shaft free end and into the spindle shaft bore;

displacing the axle shaft along the spindle shaft axis until the annular flange of the axle shaft is disposed against the hub outboard end; and coupling the annular flange of the axle shaft to the hub outboard end.

19. A wheel end assembly for rotatably coupling a wheel with a shaft of a vehicle, the wheel end assembly comprising:

a generally cylindrical hub connectable with the wheel and having an inboard axial end, an outboard axial end and an inner circumferential surface defining a bore;

a bearing disposed within the hub bore and including an outer ring coupled with hub, an inner ring disposed within the outer ring and disposeable about the shaft, the bearing inner ring having a shoulder with an outer circumferential surface, and a plurality of rolling elements disposed between the inner and outer rings; and a seal assembly for sealing an annular space between the bearing inner and outer rings, the seal assembly being disposed on the outer circumferential surface of the shoulder of the bearing inner ring and configured to seal radially outwardly against the hub inner surface or against an inner circumferential surface of a seal member coupled with the hub.

20. The wheel end assembly as recited in claim 19 wherein the bearing inner ring has a shoulder with an outer circumferential surface and the seal assembly includes an annular elastomeric seal component coupled with the inner ring shoulder and having an outer circumferential, wedge-shaped section providing a sealing lip, the sealing lip being sealingly engageable with the hub inner surface or the seal member inner surface.

\* \* \* \* \*